United States Patent Office 3,434,572
Patented Mar. 25, 1969

3,434,572
BRAKING SYSTEMS FOR AUTOMOBILE VEHICLES
Pierre Andre Georges Lepelletier, Chatou, Yvelines,
France, assignor to Societe Anonyme Francaose
du Ferodo, Paris, France, a corporation of France
Filed Aug. 2, 1966, Ser. No. 569,656
Int. Cl. B60t 11/10
U.S. Cl. 188—152                                    4 Claims

ABSTRACT OF THE DISCLOSURE

In a braking installation for the front and rear wheels of automotive vehicles, a master cylinder applies primary pressure individually to the front brakes and pressure is transmitted to the rear brakes by means of a pressure-compounding device which receives the primary and secondary pressures. The pressure-compounding device comprises a cylinder having a multiple piston therein having separate chambers for the application of the primary pressure on each side and for the secondary pressure, and a resultant chamber which alone provides the braking pressure for the rear wheel brakes.

---

The present invention relates to braking installations for automobile vehicles, especially in which a master-cylinder actuates the brakes of a first axle, while the brakes of the second axle are applied not only by the action of the so-called secondary pressure capable of being developed by the reactions resulting from the action of braking of the brakes of the first axle, but also by the effect of one and/or the other of the so-called primary pressures which the master cylinder develops for the operation of the brakes of the first axle. The first axle is for example a front axle, while the second axle is a rear axle.

In the installations of this kind proposed up to the present time, which are directed to reinforcing the braking of the rear brakes, especially on reverse running, the construction of the rear brakes necessitates a double supply circuit.

The present invention has for its object improvements in such installations which permit, with a very simple construction of the rear brakes, with a supply by a single pipe for each brake and a wheel cylinder of the usual type, excellent braking performances to be obtained both on reverse running and on forward running, with an appropriate distribution of the braking power between the front and the rear.

According to the improvements of the invention, the brakes of the second axle are brakes with a single supply, and each of them is supplied by a resultant pressure obtained in a pressure-compounding station from at least two component pressures, one of which is the secondary pressure while the other or others are one or both the primary pressures. This station can be provided at any desired location on the vehicle.

In one form of construction, the right-hand brake of the second axle is supplied by a resultant pressure obtained in the said station from the secondary pressure and the relative primary pressure on the right-hand side, while the left-hand brake of the second axle is supplied by a resultant pressure obtained in the said station from the secondary pressure and the relative primary pressure on the left-hand side. For example, the station comprises two parts fixed together and allocated respectively to the right-hand side and the left-hand side of the vehicle, each part forming a cylinder which receives a multiple piston so as to form three chambers, a secondary component chamber, a primary component chamber relative to the corresponding side, and a resultant chamber connected to the corresponding brake of the second axle.

In addition, means are provided for a suitable supply of the various parts of the circuits during the approach movements of the brakes.

In one form of embodiment of these means, a one-way valve is interposed between each resultant chamber and the corresponding primary component chamber, this valve permitting a flow of fluid between the said primary component chamber and the said resultant chamber and preventing any flow in the opposite direction, except when the secondary pressure is zero or small, by then causing a forced opening of the valve in order to ensure the simultaneous supply of the brakes of the two axles during the approach movement of the brakes.

In an alternative form of the said means, at the moment of approach of the brakes, the brakes of the second axle are supplied from a tank under the thrust of the multiple piston, the communication between the brakes of the second axle and the tank being cut-off from a pre-determined position of the travel of the said piston.

In a modified form of construction of the improvements according to the invention, the two brakes of the second axle are supplied by a single resultant pressure obtained from the station from the secondary pressure and the two primary pressures. For example, this station comprises a cylinder receiving a multiple piston which forms a secondary component chamber, a primary component chamber relative to the right-hand side, a primary component chamber relative to the left-hand side, and a resultant chamber connected to the two brakes of the second axle. In addition, a one-way valve is preferably interposed between the secondary component chamber and the resultant chamber, so as to permit a flow of fluid between the secondary component chamber and the resultant chamber and to prevent any flow in the reverse direction.

In addition, the invention has for its object improvements in braking installations for automobile vehicles, in which a master-cylinder operates the brakes of a first axle, while the brakes of the second axle are applied, at least in part, by the action of the so-called secondary pressure which can be developed by the reactions resulting from the braking operation of the brakes of the first axle, these improvements consisting of a depression device arranged in the supply to the brakes of the second axle.

In one form of construction, the master-cylinder comprises a secondary chamber which reduces in volume when the pedal is depressed, and which is interposed between the brakes of the first axle and the depression device. The depression device then has the essential function of preventing excessive braking on the rear during high decelerations.

As an alternative and according to a particular characteristic feature of the invention, the depression device is interposed between the brakes of the first axle and the secondary chamber of the master-cylinder, which, in addition to the above-mentioned function, enables the efficiency to be increased.

The various improvements according to the invention may be adopted separately or in combination and preferably, in such a combination, the depression device co-operates with the pressure-compounding station. The depression device is advantageously but not necessarily incorporated in the said station, for example fixed laterally to the said station or mounted in its axial extension.

The objects, characteristic features and advantages of the invention will furthermore be brought out in the description which follows below of forms of embodiment chosen by way of example, reference being made to the accompanying drawings, in which:

FIG. 6 is a view in cross-section of an alternative form of the pressure-compounding station, applicable especially to the installation of FIG. 5 or FIG. 5a;

Reference will first be made to the diagram of FIG. 1. A braking installation for an automobile vehicle comprises a master-cylinder 10 in which a master-piston 11, actuated by a pedal 12, is slidably mounted. The master piston 11 comprises three pistons 13, 14 and 15 of increasing diameters. At the front of the piston 13 is defined a primary chamber 16. Between the pistons 13 and 14 is formed a secondary chamber 18 and between the pistons 14 and 15 is defined a further primary chamber 17.

The chambers 16, 17 and 18 are intended to communicate respectively with compartments 19, 20 and 21 of a tank 22 through the intermediary of clapper-valves 23, 24 and 25. These valves are partly open when the pedal 12 is completely released and are intended to close as soon as the master-piston 11 is pushed in by the action of the pedal 12.

Figure 1:
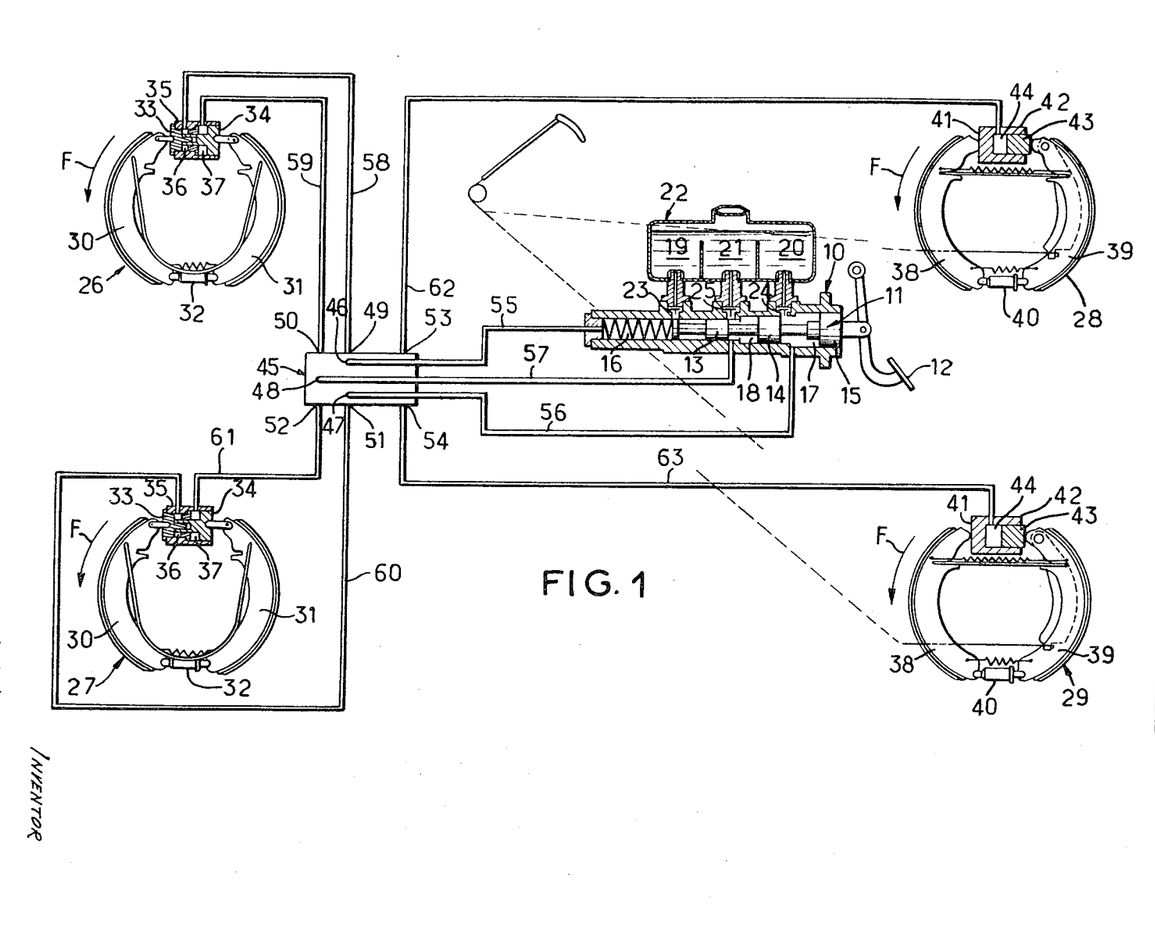
FIG. 1 is a general diagram of a braking installation in accordance with the invention.

In the example shown in FIG. 1, the front brakes 26 and 27 are of the drum type with double supply, while the rear brakes 28 and 29 are of the drum type with single supply.

Each front brake 26, 27 comprises a primary jaw 30 and a secondary jaw 31 which are coupled by a free coupling bar 32 and which are supported, opposite the bar 32, respectively against a primary piston 33 and against a secondary piston 34 of a wheel cylinder 35. This latter is divided into two compartments, a primary compartment 36 in which is mounted the primary piston 33 acting on the primary jaw 30, and a secondary compartment 37 in which is located the secondary piston 34 acting on the secondary jaw 31.

Each rear brake 28, 29 comprises a pair of jaws 38 and 39 which are coupled by a free coupling bar 40 and which are respectively supported, opposite to the bar 40, against the bottom 41 of a cylinder 42 and against a piston 43 engaged in the cylinder 42. The piston 43 forms a chamber 44 in the cylinder 42.

In addition, the braking installation comprises a pressure-compounding station 45 coupled to the master-cylinder 10 and to the four brakes 26, 27, 28 and 29.

The station 45 comprises nine connection orifices 46, 47, 48, 49, 50, 51, 52, 53 and 54.

The orifice 46 is connected by a conduit 55 to the primary chamber 16 of the master-cylinder 10. The orifice 47 is connected by a conduit 56 to the other primary chamber 17 of the master-cylinder 10. The orifice 48 is connected by a conduit 57 to the secondary chamber 18 of the master-cylinder 10. The orifice 49 is connected by a conduit 58 to the primary compartment 36 of the right-hand front brake 26. The orifice 50 is connected by a conduit 59 to the secondary compartment 37 of the right-hand front brake 26. The orifice 51 is connected by a conduit 60 to the primary compartment 36 of the left-hand front brake 27. The orifice 52 is connected by a conduit 61 to the secondary compartment 37 of the left-hand front brake 27. The orifice 53 is connected by a conduit 62 to the chamber 44 of the right-hand rear brake 28, and the orifice 54 is connected by a conduit 63 to the chamber 44 of the left-hand rear brake 29.

Figure 2:
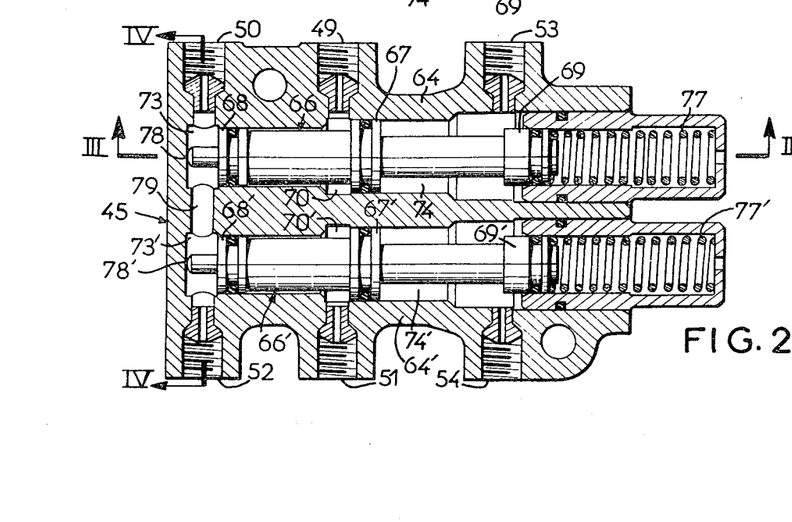
FIG. 2 is a view in cross-section of the pressure-compounding station of this installation.
Figure 3:
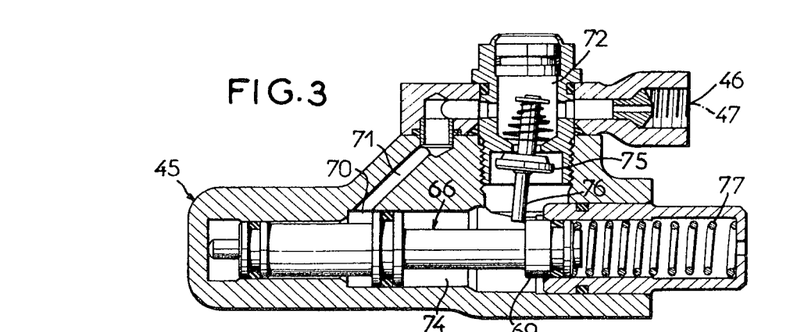
FIGS. 3 and 4 are corresponding views in cross-section, taken respectively along the line III—III and the line IV—IV of FIG. 2.
Figure 4:
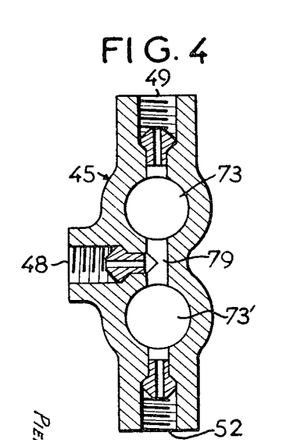

Reference will now be made to FIGS. 2, 3 and 4 in which is shown the construction of the station 45. This station comprises two identical cylinder bodies 64 and 64' arranged side by side.

In the cylinder 64 is slidably mounted a piston unit 66 having a central piston 67 and two end pistons 68 and 69, each of which has a diameter smaller than that of the central piston 67. The diameters of the pistons 68 and 69 are preferably substantially equal, so as to avoid any premature closure of the valve 75 in advance of the piston 66.

Between the pistons 67 and 68 is formed a primary component chamber 70 which is coupled on the one hand to the orifice 49 and on the other, through the intermediary of a passage 71 comprising a chamber 72, to the orifice 46. Beyond the piston 68 is formed a secondary component chamber 73 which is connected to the orifice 50. Between the pistons 67 and 69 is formed a chamber 74 of resultant pressure which is connected to the orifice 53. Between the chambers 72 and 74 is interposed a one-way valve 75 having a tail 76 adapted to be tilted by the piston 69.

In the position of rest of the piston unit 65 shown in FIGS. 3 and 4, in which a spring 77 pushes the piston unit 66 towards the left of FIG. 3 or 4, in abutment at 78, the tail 76 is tilted, which partly opens the valve 75. In any other position displaced from this position of rest towards the right of FIG. 3 or 4, the tail 76 is freed and the valve 75 can function in the normal manner in which it permits a flow of fluid between the chamber 72 and the chamber 74 and prevents any flow in the reverse direction.

The cylinder 64' is constituted in the same way as the cylinder 64 and comprises the same parts. The elements of the cylinder 64' are indicated by the same reference numbers as those of the cylinder 64 but are given a prime.

The primary component chamber 70' is connected to the orifices 51 and 47. The secondary component chamber 73' is connected to the orifice 52. The chambers 73 and 73' are further connected, one to the other by a passage 79 which communicates with the orifice 48. Thus the assembly 18, 57, 48, 79, 73, 59, 73', 52, 61 forms one single circuit, known as the secondary circuit, in which a single pressure exists everywhere.

During braking on forward running (arrow F), equivalent volumes are expelled by the master-cylinder 10, on the one hand through the conduit 55, 46, 71, 70, 49, 58, into the primary chamber 36 of the right-hand front brake 26, and on the other hand through the conduit 56, 47, 72', 71', 70', 51, 60, into the primary chamber 36 of the left-hand front brake 27. As long as the braking reaction has not developed in the front brakes 26 and 27, the valves 75 and 75' of the station 45 are partly open and the primary pressures passing, as has been seen above, into the chambers 72 and 72' pass through the chamber 74 respectively to the orifice 53, the conduit 62 into the chamber 44 of the right-hand rear brake 28, and through the chamber 74', the orifice 54 and the conduit 63 into the chamber 44 of the left-hand rear brake 29. In this preliminary phase, the four brakes are thus permitted at the same time to reach a condition in which the jaws have come into contact with their respective drums.

This contact results in a braking reaction in the front brakes 26 and 27 which produces a large increase in pressure in the chambers 37 and the conduits 59 and 61. The braking reactions of the front brakes 26 and 27 are balanced by the inter-communication of the chambers 37 by means of the piping system 59, 73, 79, 73', 61. This high-pressure at 73 and 73' pushes back the pistons 66 and 66' towards the right of FIG. 2, against the action of the springs 77 and 77', which releases the valves 75 and 75'. The latter now permit only the flow of fluid in the direction 72, 74 or 72', 74'.

For the right-hand side of the vehicle, the pressures in the secondary chamber 73 and in the primary chamber 70 become mixed with each other so as to produce a resultant pressure in the chamber 74. This resultant pressure is sent through the conduit 62 into the chamber 44 of the right-hand rear brake 28. The said pressure is large and depends not only on the braking reaction developed at the front, but also on the force applied to the pedal 12 by the user.

For the left-hand side of the vehicle, the pressures in the secondary chamber 73' and in the primary chamber 70' are compounded in a manner similar to that which has just been described for the right-hand side, so as to produce a resultant pressure in the chamber 74'. This resultant pressure is sent through the conduit 63 into the chamber 44 of the left-hand rear brake 29. This latter pressure may be slightly different from the pressure applied in the chamber 44 of the right-hand rear brake 28, depending on the conditions of coefficient of friction at the front, the conditions of adhesion, etc.

In any case, the two pressures in the chambers 44 of the rear brakes 28 and 29 are high and permit effective braking, having satisfactory conditions of balance by reason of the self-releasing operation of the rear brakes.

It will be appreciated that the installation which has just been described has not only an excellent operation but is of very simple construction and not prone to failures. In particular, it will be noted that the rear brakes 28 and 29 are very simple, the conduits such as 62 and 63 are reduced in number to two, which reduces the risk of breakage. It will also be noted that the construction of the compounding station 45, at which the various circuits are concentrated, is simple and compact. The station 45 of small overall size can be mounted at any point which is considered the most convenient in the vehicle.

The arrangement which has been described above has advantages of a better behaviour of the vehicle if there is a loss of adhesion on one or more wheels, a circumstance which can be very dangerous, together with increased safety in the event of a circuit fracture.

Whereas during normal working, when braking on forward running, the primary pressures at 70 and 70' are small, while the secondary pressure at 73, 79, 73' is preponderant and imposes balancing conditions between the right-hand and left-hand and between the front and the rear of the vehicle, if a loss of adhesion occurs on one of the front wheels, for example, if the left-hand front wheel becomes locked, these relative actions are modified.

For the left-hand portion of the vehicle, the primary pressure at 70' is then large and increases the braking torque of the left-hand rear brake 29 without it being necessary to press further on the brake pedal 12. In all, the sum of the braking torques on the right-hand half of the vehicle and the sum of the braking torques on the left-hand half are simultaneously increased and differ very little from each other. This results in a very good stability of the vehicle, together with effective braking.

If the two front wheels become locked, by virtue of the arrangement according to the invention, the braking will continue to be effective by the rear brakes, with the possibility of going when so required up to locking one or the other of the two rear brakes for the purpose of maximum braking.

In the case where the secondary circuit 18, 57, 48, 79, 73, 59, 73', 52, 61 became defective, the pistons 34 come into abutment. Braking is effected on the front brakes 26 and 27 by the chambers 36 and on the rear brakes 28 and 29 by the chambers 74 and 74'.

The device permits sufficient balancing to be obtained in the event of a defect on a primary circuit.

During braking on reverse running, the reactions of the jaws 30 and 31 are reversed in the front brakes 26 and 27. The secondary pressure at 37 no longer increases, as was the case during forward running. The primary pressures at 70 and 70' actuate the four brakes directly and efficiently.

It will be appreciated that the participation of the primary is large both on forward running and in reverse. It is the same participation in forward running and in reverse running, but assisted by the secondary pressure for forward running when the rear brakes have a self-releasing action, whereas the assistance is eliminated and is not useful in reverse running since the the rear brakes then become self-releasing.

It will thus be noted that the reinforcement of the rear brakes by means of the primary pressure is large, other things being equal, in the circumstances when this is particularly useful, that is to say when the secondary pressure becomes limited, for example in the event of locking of the front wheels during braking on forward running, or small, for example during braking on reverse running.

In an alternative form shown in FIGS. 5 and 6, the arrangement is similar to that which has just been described with reference to FIGS. 1 to 4, but the construction of the station 45 is modified, and the installation further comprises a pressure-reduction device, indicated by the reference 80. The device 80 serves in general to reduce the secondary pressures above a predetermined maximum and may also serve as a booster for the primary pressures, as will be explained in greater detail below.

In FIG. 6, there are again seen at 66 and 66' the two pistons, at 73 and 73' the secondary component chambers and their communication 79, the primary component chambers 70 and 70', the resultant chambers 74 and 74', but the oscillating clapper-valves 75 and 75' are replaced by balls 81 and 81', which are normally closed except at rest, in the absence of secondary pressure, when stop-members 82 and 82' cause the lifting of the said balls 81 and 81'.

The device 80 comprises an inlet 83 and an outlet 84, which is connected to the secondary space 73, 79, 73'.

The device 80, of any suitable construction, comprises a piston 85 co-operating with a calibrating spring 86. As long as the pressure admitted to the inlet 83 does not exceed a value corresponding to the calibration of the spring 86, this pressure is conducted without modification towards the outlet 84. When the pressure admitted to the inlet 83 reaches a value corresponding to the calibration of the spring 86, the piston 85 moves and introduces a step-down pressure ratio.

Figure 6:
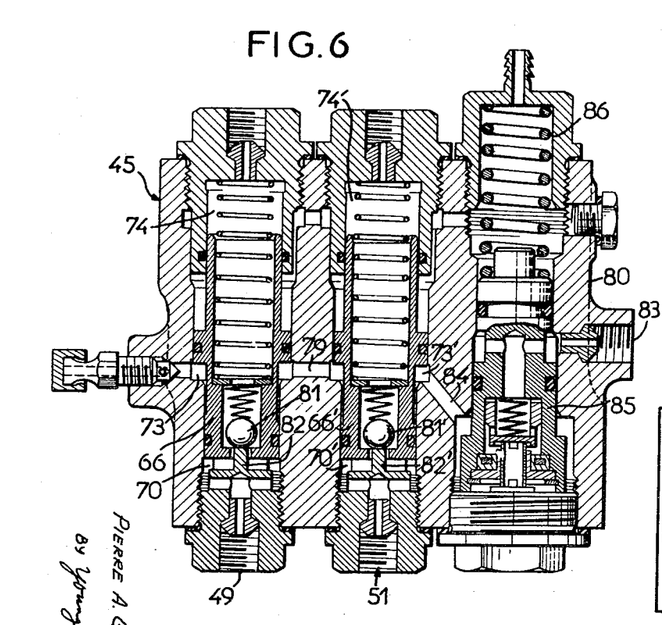

In the example shown in FIG. 6, the pressure-reduction device 80 is incorporated with the station 45 on which it is fixed laterally.

Figure 5:
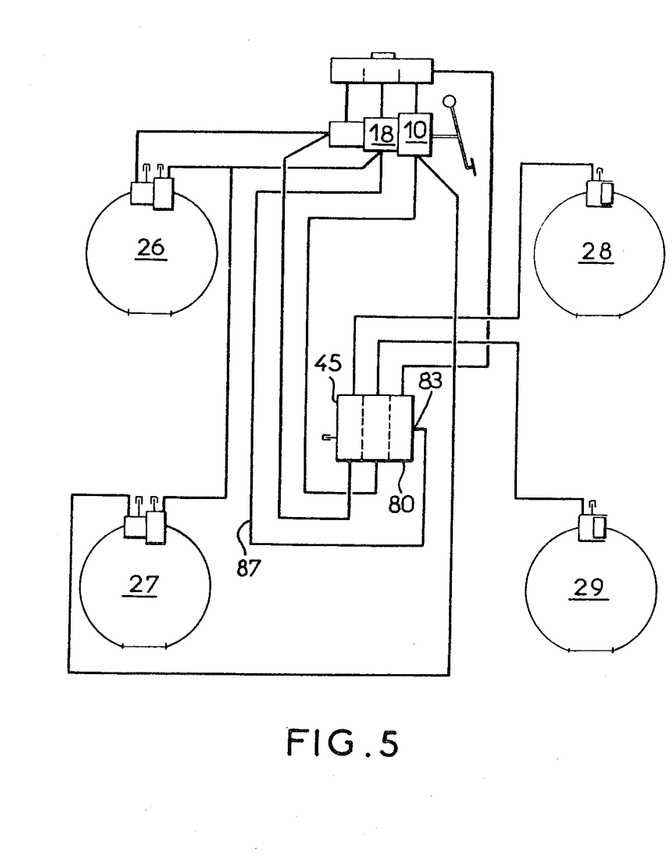
FIGS. 5 and 5a are views similar to FIG. 1, but relating respectively to two alternative forms of installation diagrams.

In the example of mounting shown in FIG. 5, the secondary chamber 18 of the master-cylinder 10 is interposed between the brakes 26, 27 and the device 80. In other words, the inlet 83 is located downstream of the chamber 18 and is connected to it by a conduit 87. In this case, the device 80 is mainly directed to preventing the locking of the rear brakes 28 and 29 during hard braking action.

In the alternative diagram shown in FIG. 5a to which reference will now be made, the pressure-reduction device 80 is interposed between the brakes 26, 27 and the secondary chamber 18 of the master-cylinder 10. There is shown at 88 a connection conduit of the inlet 83 of the device 80 with the secondary chambers 37 of the brakes 26 and 27.

Figure 5A:
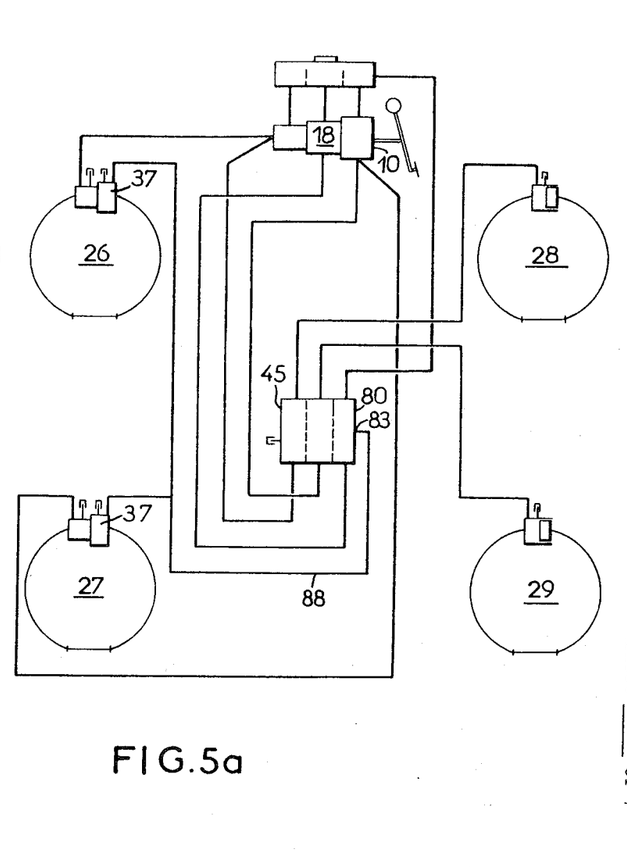

The arrangement of FIG. 5a permits as previously the locking of the rear brakes 28 and 29 to be prevented, in the case of hard braking, but has in addition the following advantage:

By its position, so to speak on the upstream side of the master-cylinder 10, the device 80 enables the pressure to be stepped-down, not only in the rear brakes 28 and 29, but also in the chamber 18 of the master cylinder. For this reason, the force at the brake pedal is relieved, and for a given force at the pedal, the braking is on the whole more effective. In other words, the device 80 may be considered as playing the part of a pressure-booster for the front brakes 26 and 27.

Reference will now be made to FIGS. 7 to 11, in which the arrangement is similar to those which have been previously described, but in which, at the moment of approach of the brakes, the brakes 28 and 29 are supplied from a tank 90 under the thrust of the pistons 66 and 66', the communication between the brakes 28, 29 and the tank 90 being interrupted at a given position of the travel of the pistons 66 and 66'. To this end, each of the pistons 66 and 66' comprises a cup 91 which co-operates with an orifice 92 communicating with the tank 90, in such manner that the cup 91 closes the orifice 92 from the beginning of the travel. In FIGS. 8 to 11, there are again seen the various connection orifices of the station 45, in particular the orifices 49, 50, etc.

Figure 7:
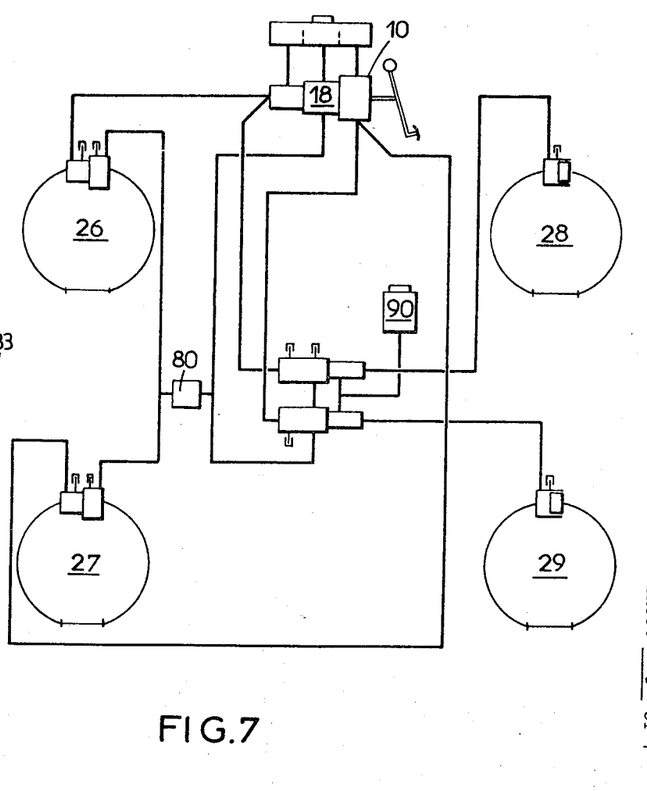
FIG. 7 is a further alternative form of installation diagram.
Figure 8:
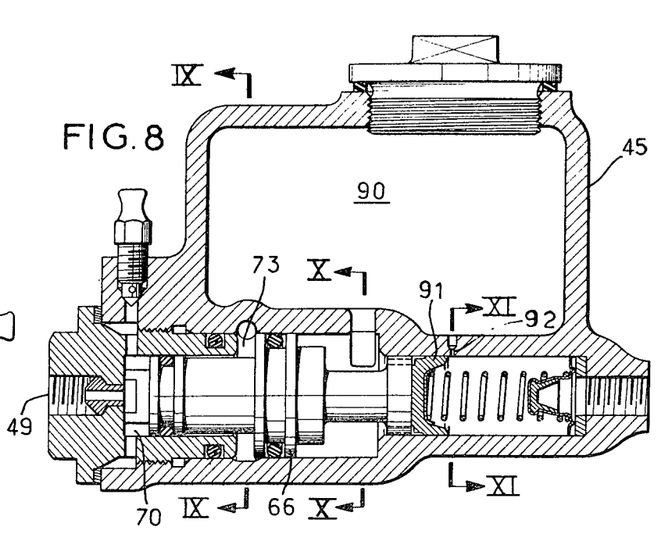
FIG. 8 is a view in cross-section of an alternative form of the pressure-compounding station, which is especially applicable to the installation of FIG. 7.
Figure 9:
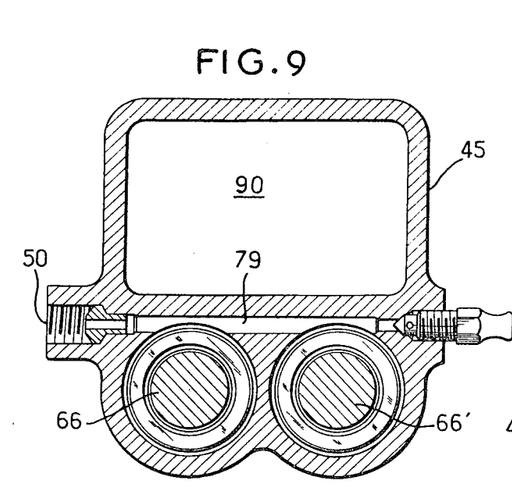
FIGS. 9, 10 and 11 are corresponding views in cross-section, taken respectively along the line IX—IX, X—X and XI—XI of FIG. 8.
Figure 10:
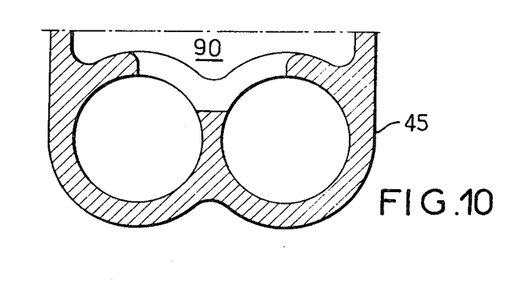
Figure 11:
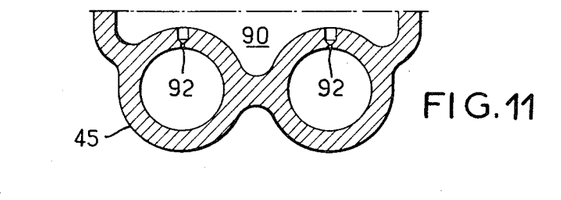

The diagram of FIG. 7 is similar to that of FIG. 1. There is again seen in FIG. 7 the tank 90, while a pressure-reducing device 80 can be provided in the installation, and in the case of FIG. 7 is mounted upstream of the chamber 18 of the master-cylinder 10, in a manner similar to that which has been described with reference to FIG. 5a.

In the various forms of embodiment which have been described up to the present, the right-hand rear brake 28 is supplied by a resultant pressure produced in the station 45 from the secondary pressure and the relative primary pressure on the right-hand side, and the left-hand rear brake is supplied by a resultant pressure obtained in the station 45 from the secondary pressure and the relative primary pressure on the left-hand side.

In the forms of embodiment which will now be described, the two rear brakes 28 and 29 are supplied by a single resultant pressure produced in the station 45 from the secondary pressure and the two primary pressures.

Figures 12, 13:
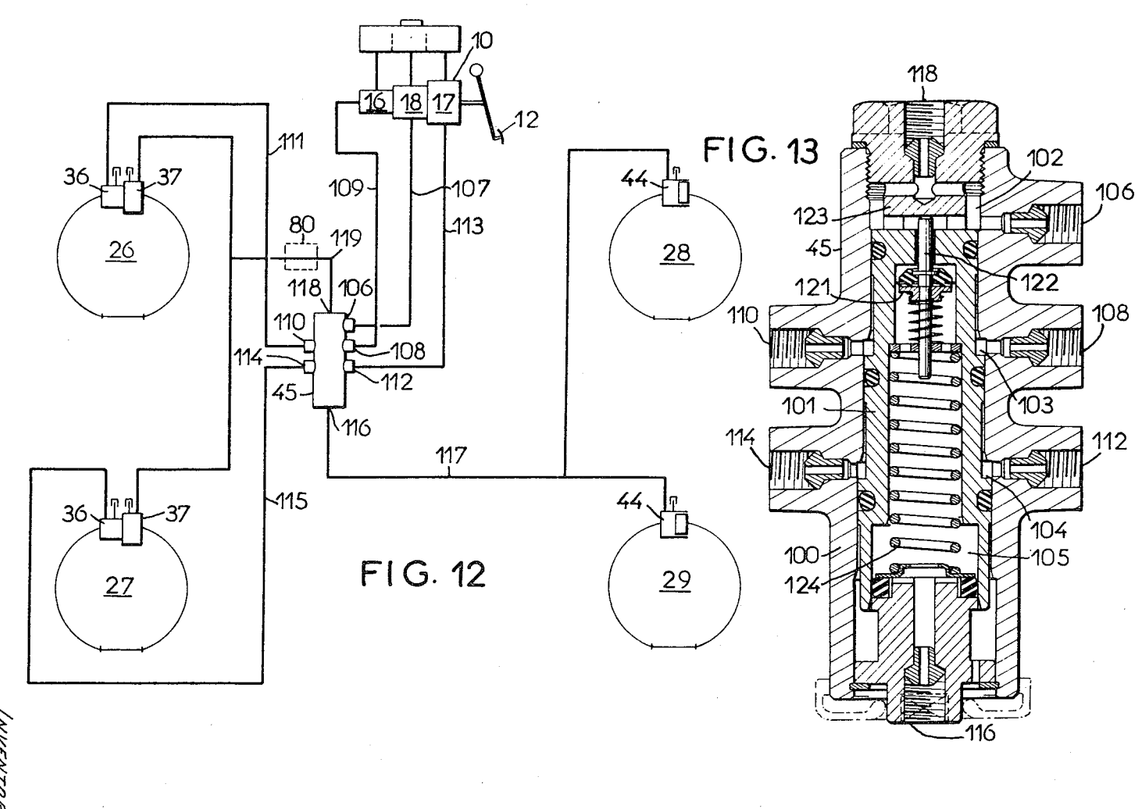
FIG. 12 relates to a further alternative form of installation diagram.
FIG. 13 is a view in cross-section of an alternative form of the pressure-compounding station which is especially applicable to the installation shown in FIG. 12.

Reference will now be made more particularly to FIGS. 12 and 13, in which the station 45 comprises (FIG. 13) a cylinder 100 receiving a multiple piston 101. This piston forms chambers 102, 103, 104 and 105. The chamber 102 is a secondary component chamber connected at 106 to the conduit 107 which connects with the chamber 18 of the master-cylinder 10, and at 118 to the conduit 119 for connection to the secondary chambers 37 of the front brakes 26 and 27. The chamber 103 is a primary component chamber connected at 108 to a conduit 109 which connects with the chamber 16 of the master-cylinder 10, and at 110 to a conduit 111 which connects to the primary chamber 36 of the right-hand front brake 26.

The chamber 104 is a primary component chamber connected at 112 to a conduit 113 for coupling to the chamber 17 of the master-cylinder 10 and at 114 by a conduit 115 to the chamber 36 of the left-hand front brake 27.

The chamber 105 is the resultant chamber connected at 116 to the conduit 117 which supplies the rear brakes 28 and 29. The chamber 105 is separated from the chamber 102 by a one-way valve 121, having a function similar to that of the valves 75 and 75'. The valve 121 permits a circulation of fluid in the direction 102, 105, but prevents any flow in the reverse direction except in the position of rest, at which the rod 122 of the valve 121 is lifted by coming into abutment against the plug 123.

It will be noted from FIG. 13 that the useful section of the resultant chamber 105 is substantially equal to the useful section of the component chamber 102. As soon as the primary pressures at 102 and 104 overcome the resistance of the spring 124, which is chosen to be small, the system moves and the valve 121 closes without requiring to wait for the increase in secondary pressure. With an arrangement of this kind, it is possible to choose a smaller diameter for the wheel cylinders of the brakes 28 and 29, since the pressures admitted at 44 are the sum of three primary and secondary pressures. It is furthermore possible to strengthen the braking of the brakes 28 and 29, in the event of locking of the brakes 26 and 27, by pressing harder on the pedal 12. When such locking takes place, the secondary pressure falls and the function of the primary pressures is increased.

It will furthermore be observed that the primary participation, very small on forward running, is very great on reverse running for the same reason as has already been stated above.

In the diagram of FIG. 12, it will be noted that a pressure-reduction device 80 can be added, for example in the position comprised between the brakes 26, 27 and the station 45, in a manner similar to that which has been described with reference to FIG. 5a.

Figure 14:
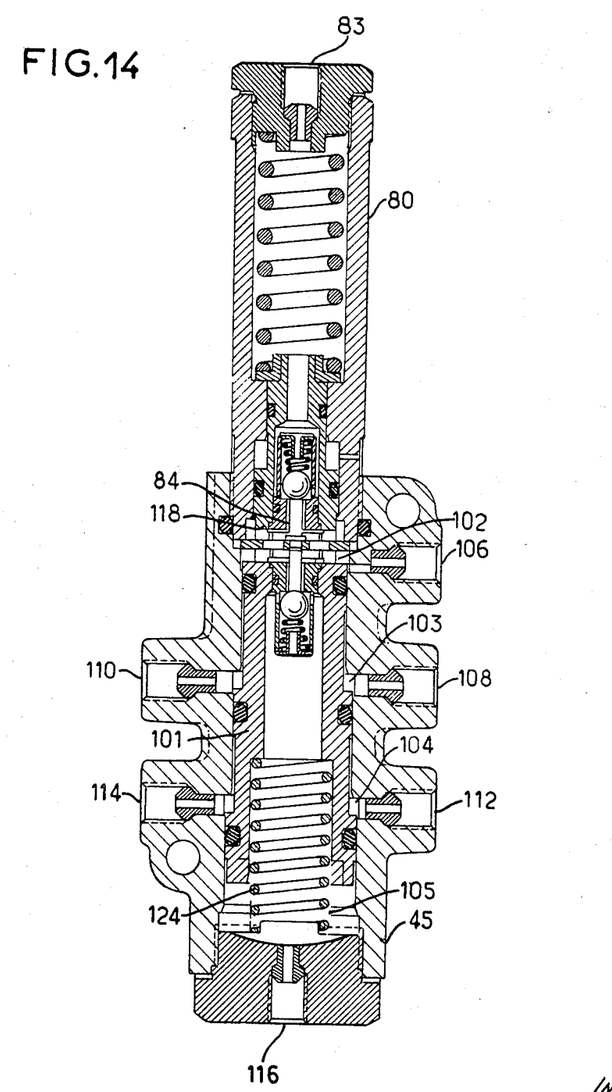
FIG. 14 is concerned with still another alternative form.

The device 80 can be placed at any point of the installation, for example mounted against the station 45 as in FIGS. 5 and 6, or again isolated as in FIGS. 7 and 12, or again mounted in the axial extension of the station 45, as shown in FIG. 14, to which reference will now be made.

The station 45 is of the type shown in FIG. 13, with the chambers 102, 103, 104, 105, and the orifices 106, 108, 112, 116, 114, 110 and 118.

The station 45 has been given a modification as compared with that of FIG. 13, in that the useful section of the resultant chamber 105 is substantially greater than the useful section of the secondary component 102. By virtue of this arrangement, excessive braking on the brakes 28 and 29 is avoided in case of locking of the wheels 26 and 27.

The device 80 is of the type shown in FIG. 6. There is again shown its inlet at 83, while its outlet 84 coincides with the orifice 118. The operation of the unit 45, 80 is similar to that which has been previously described. It will however be noted that during the course of braking on forward running, the piston 101 does not move unless the secondary pressure is zero or small, which can hardly occur except in case of locking of the front wheels on very bad adhesion.

During braking on reverse running, whereas the secondary pressure is low, the piston 101 moves in the same manner in FIG. 14 as in FIG. 13.

It will of course be understood that the invention is not limited to the forms of construction described and shown but includes all alternative forms in the embodiment of its various elements and in its applications.

In particular, the useful section of the chamber 105 may be comprised between a value equal to the section of the chamber 102, as in FIG. 13, and a section such as that shown in FIG. 14, which is substantially greater, with a view to obtaining effects intermediate between those which result from the arrangements shown in FIGS. 13 and 14. In addition, the section of the chamber 105 could, if so desired, be greater than that which has been shown in FIG. 14.

If required, the section of the chamber 105 could be smaller than that shown in FIG. 13, etc. The supply means for the rear brakes for the purpose of the approach can, in its various applications, be given forms of construction different from those shown, for example, the means provided in FIG. 13, comprising the clapper-valve 121 could be adapted to FIG. 2 or FIG. 6 etc.

What I claim is:

1. In a braking installation for automobile vehicles of the kind comprising a master-cylinder adapted to actuate the brakes of a first axle while the brakes of a second axle are applied, not only by the action of the secondary pressure developed by the reactions resulting from the action of the brakes of said first axle, but also by the effect of at least one of the primary pressures developed by said master-cylinder for the actuation of the brakes of said first axle, the improvements according to which:
- (a) said installation includes a pressure-compounding station adapted to receive the primary and secondary pressures;
- (b) the brakes of said second axle are brakes with a single supply circuit, each said brake being actuated by a resultant pressure derived from said compounding station;
- (c) said resultant pressure is constituted by at least two pressures, one of which is said secondary pressure while the other or others are one or both of said primary pressures; and
- (d) said pressure-compounding station comprises a cylinder having a multiple piston therein so as to form a secondary component chamber, a primary component chamber corresponding to the right-hand side, a primary component chamber corresponding to the left-hand side, and a resultant chamber coupled to the two brakes of said second axle.

2. Improvements in braking installations as claimed in claim 1, in which the right-hand brake of said second axle is supplied by a resultant pressure derived from said pressure compounding station and constituted by the secondary pressure and the relative primary pressure on the right-hand side, while the left-hand brake of said second axle is supplied by a resultant pressure derived from said compounding station and constituted by the secondary pressure and the primary pressure relative to the left-hand side.

3. Improvements in braking installations as claimed in claim 1, in which the two brakes of said second axle are supplied by a single resultant pressure derived from said compounding station, and constituted by the secondary pressure and the two primary pressures.

4. Improvements in braking installations as claimed in claim 1, in which said first axle is the front axle and said second axle is the rear axle.

References Cited

UNITED STATES PATENTS

| | | |
|---|---|---|
| 2,144,020 | 1/1939 | Hunt. |
| 2,920,451 | 1/1960 | Milster. |
| 3,305,051 | 2/1967 | Maurice. |
| 3,306,678 | 2/1967 | Lepelletier. |

GEORGE E. A. HALVOSA, *Primary Examiner.*